United States Patent [19]

Sharma

[11] Patent Number: 4,555,649

[45] Date of Patent: Nov. 26, 1985

[54] CATHODE RAY TUBE FOCUSING CIRCUITRY

[75] Inventor: Gulab Sharma, Salt Lake City, Utah

[73] Assignee: Beehive International, Salt Lake City, Utah

[21] Appl. No.: 557,959

[22] Filed: Dec. 5, 1983

[51] Int. Cl.[4] .............................................. H01J 29/58
[52] U.S. Cl. ..................................... 315/382; 315/371
[58] Field of Search ..................... 315/382, 382.1, 393, 315/371

[56] References Cited

U.S. PATENT DOCUMENTS 3,806,758  4/1974  Lundqvist ............................ 315/382
4,348,617  9/1982  Miyazaki et al. ................... 315/382

Primary Examiner—Theodore M. Blum
Attorney, Agent, or Firm—Thorpe, North & Western

[57] ABSTRACT

A cathode ray tube focusing circuit includes a first operational amplifier for receiving a sawtooth wave signal from the vertical deflection circuit of a cathode ray tube video circuit and for producing a parabolic output signal from the sawtooth wave signal. Also included is a second operational amplifier for receiving both the parabolic signal produced by the first operational amplifier and a parabolic wave signal produced by the S-correction capacitor of the horizontal deflection circuit of the cathode ray tube video circuit. The second operational amplifier inverts the parabolic wave signal received from the first operational amplifier and adds this inverted signal to the parabolic wave signal received from the horizontal deflection circuit to produce a parabolic signal envelope. This parabolic signal envelope is inverted, amplified and supplied to the focus electrode of the cathode ray tube to modulate the focus electrode's static voltage.

5 Claims, 1 Drawing Figure

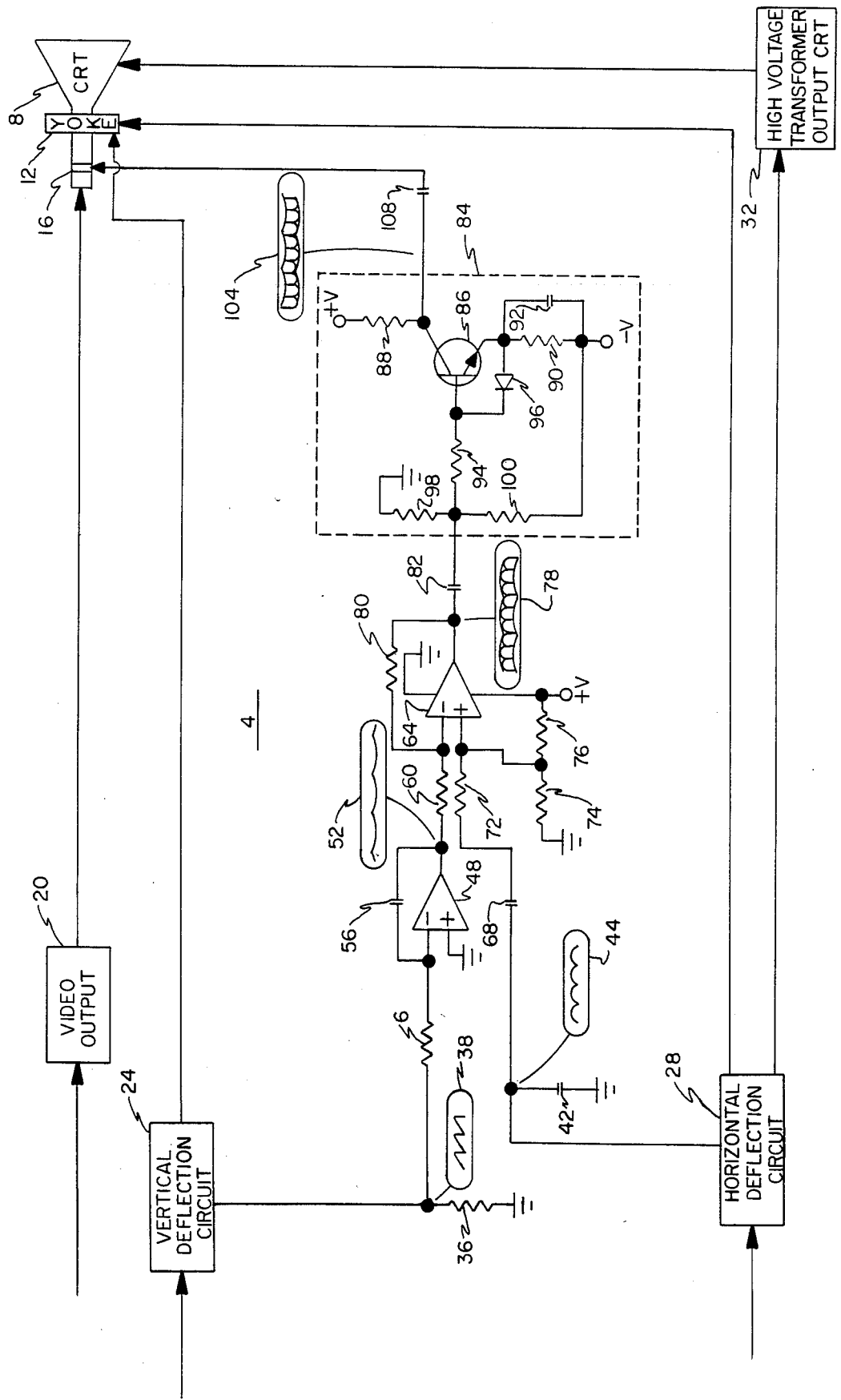

CATHODE RAY TUBE FOCUSING CIRCUITRY

BACKGROUND OF THE INVENTION

This invention relates to a dynamic focusing circuit for use in conjunction with a cathode ray tube video circuit.

Most cathode ray tubes in use today include a generally rectangular screen on which is produced a picture or other information by means of a scanning electron beam. The electron beam, which is produced by an electron gun positioned behind the screen, sweeps horizontally across the screen a line at a time at a plurality of vertical levels, all under the control of vertical and horizontal deflection circuits. Because of the geometry of the cathode ray tube screen, the distance of travel of electrons from the electron gun to the screen is not uniform over the screen. That is, the travel distance increases as the beam moves toward the sides or the top and bottom of the screen. Of course, the travel distance would be greatest to the corners of the screen.

Also included in conventional cathode ray tube circuits is focus circuitry whose function is to "focus" or narrow the electron beam at the point it strikes the screen. Since the distance of travel of the electron beam to the screen varies with the position of the beam, the focusing requirements for the beam will likewise vary. Typically, cathode ray tube circuits are adapted to focus the electron beam at about the average travel distance from the electron gun to the screen so that the sharpness and clarity of the picture will be best at locations on the screen between the center and the sides and top and bottom.

SUMMARY OF THE INVENTION

It is an object of the invention to provide a simple, inexpensive focusing circuit for use in cathode ray tube circuits.

It is another object of the invention to provide such a focusing circuit capable of modulating and focusing the electron beam in both the vertical and horizontal direction.

It is an additional object of the invention to provide such a focusing circuit which varies the focusing of a scanning electron beam to account for varying travel distance of the beam from the electron gun to the screen.

The above and other objects of the invention are realized in a specific illustrative embodiment of a focusing circuit adapted for use in a cathode ray tube video circuit. The cathode ray tube video circuit is of conventional design and includes a cathode ray tube having a generally rectangular screen and a focus electrode for controlling the focusing of the electron beam of the cathode ray tube, a vertical deflection circuit which produces a first sawtooth wave signal which identifies the vertical location on the screen of the electron beam, and a horizontal deflection circuit which produces a second sawtooth wave signal which identifies the horizontal location on the screen of the electron beam. The horizontal deflection circuit includes a so-called S-correction capacitor which produces an inverted parabolic wave signal from the second sawtooth wave signal. The focusing circuit of the invention includes a first operational amplifier circuit coupled to the vertical deflection circuit for producing a parabolic wave signal from the first sawtooth wave signal, a second operational amplifier circuit for inverting the parabolic wave signal produced by the first operational amplifier circuit and for adding this inverted parabolic wave signal and the inverted parabolic wave signal produced by the horizontal deflection circuit to produce a parabolic signal envelope, and a linear amplifier circuit for inverting, amplifying and appying the parabolic signal envelope to the focus electrode of the cathode ray tube. The parabolic signal envelope applied to the focus electrode serves to modulate the static focusing voltage of the focus electrode so that the electron beam is dynamically focused as it sweeps across the cathode ray tube screen. The result is that the electron beam is sharply focused at all locations on the screen.

BRIEF DESCRIPTION OF THE DRAWING

The above and other objects, features and advantages of the invention will become apparent from a consideration of the following detailed description presented in connection with the accompanying drawing which is a circuit schematic of focusing circuitry made in accordance with the principles of the present invention.

DETAILED DESCRIPTION

The drawing shows focusing circuitry 4 made in accordance with the present invention and connected into conventional cathode ray tube video circuitry. Included are a cathode ray tube 8, a yoke 12 mounted on the cathode ray tube for deflecting horizontally and vertically the cathode ray tube's electron beam, and a focusing electrode 16 also coupled to the cathode ray tube for producing a D.C. focusing voltage (static focus voltage) which focuses the electron beam on the cathode ray tube screen. A conventional video output circuit 20 is coupled to the cathode ray tube to supply the video signal to be displayed. A vertical deflection circuit 24 and a horizontal deflection circuit 28 are both coupled to the yoke 12 for supplying respectively vertical deflection and horizontal deflection signals. A high voltage transformer output circuit 32 is coupled between the horizontal deflection circuit 28 and the cathode ray tube 8. All of the above is conventional circuitry used for controlling the display of information on a cathode ray tube.

The focusing circuitry 4 utilizes two inputs derived from the vertical deflection circuit 24 and the horizontal deflection circuit 28 to produce an output signal which is supplied to the focus electrode 16. The input from the vertical deflection circuit 24 is utilized for controlling the frame (vertical direction) focusing, whereas the input from the horizontal deflection circuit 28 is used to control the line (horizontal direction) focusing. Specifically, the frame input is derived from a current feedback resistor 36 of the vertical deflection circuit 24 and this input is a conventional sawtooth voltage signal waveform represented at 38. This waveform is also supplied to the yoke 12 to define and control the location of the electron beam of the cathode ray tube 8 in the vertical direction. The line input is derived from a so-called S-correction capacitor 42 of the horizontal deflection circuit 28. This input is a scallop or inverted parabolic voltage waveform, illustrated at 44, produced by the capacitor 42 from a sawtooth signal waveform which is generated by the horizontal deflection circuit 28 for controlling the location of the electron beam of the cathode ray tube 8 in the horizontal direction. The frequency of the inverted parabolic wave form is a multiple of the frequency of the vertical deflection circuit sawtooth voltage signal and corresponds to the number of lines there are per frame. The capacitor 42 is a blocking capacitor which also serves to provide the "S" shaping of the current waveform of the yoke 12.

The sawtooth voltage signal 38 is supplied via a resistor 6 to the inverting input of an operational amplifier 48 where the signal is integrated to produce a parabolic output waveform illustrated at 52. A feedback capacitor 56 couples the output of the operational amplifier 48 to the inverting input thereof. The non-inverting input of the operational amplifier 48 is coupled to the ground.

The output of the operational amplifier 48 is supplied via a resistor 60 to the inverting input of a second operational amplifier 64. The waveform 44 from the capacitor 42 is supplied via a coupling capacitor 68 and a resistor 72 to the non-inverting input of the operational amplifier 64. The non-inverting input of the operational amplifier 64 is also coupled to the junction between biasing resistors 74 and 76, the former of which is coupled to ground and the latter of which is coupled to a positive voltage source. The operational amplifier 64 inverts the parabolic waveform 52 and adds the two inputs to produce an inverted parabolic signal envelope, indicated at 78. This envelope, of course, represents the combined line and frame parabolic waveforms.

The output of the operational amplifier 64 is supplied via a coupling capacitor 82 to a linear amplifier and inverter circuit 84. The amplifier and inverter circuit 84 includes a transistor 86 whose collector electrode is coupled by way of a resistor 88 to a positive voltage source, whose emitter electrode is coupled by way of a parallel connection of a resistor 90 and a capacitor 92 to a negative voltage source, and whose base electrode is coupled via a resistor 94 to the coupling capacitor 82 and also via a diode 96 to the emitter electrode. Another resistor 98 couples the junction between the capacitor 82 and resistor 94 to ground potential, and a resistor 100 couples this same junction to a negative voltage source.

The linear amplifier and inverter 84 amplifies the waveform 78 and inverts it to produce the waveform indicated at 104 which is supplied via a capacitor 108 to the focusing electrode 16. This waveform modulates the static voltage of the focus electrode 16 so that as the electron beam sweeps across the cathode ray tube screen, it is modulated to account for the varying travel distance of the beam from the electron gun to the screen.

In the manner described, a simple focusing circuit is provided with conventional cathode ray tube video circuitry to dynamically control the focusing of the electron beam on the screen. This results in a sharper, more uniform picture over the entire cathode ray tube screen.

It should be understood that the above arrangement is only illustrative of the principles of the present invention and that numerous other arrangements and modifications could be provided without departing from the spirit and scope of the invention. The appended claims are intended to cover such arrangements and modifications.

What is claimed is:

1. Cathode ray tube focusing circuitry for use in a cathode ray tube video circuit which includes a cathode ray tube having a generally rectangular screen and a focus electrode for producing a D.C. voltage for controlling the focusing of the electron beam of the cathode ray tube, a vertical deflection circuit which produces a first sawtooth wave signal which identifies the vertical location on the screen of the electron beam, and a horizontal deflection circuit which produces a second sawtooth wave signal which identifies the horizontal location on the screen of the electron beam, said horizontal deflection circuit including a capacitor which produces an inverted parabolic wave signal from the second sawtooth wave signal, said focusing circuitry including:

first operational amplifier means coupled to the vertical deflection circuit for producing a parabolic wave signal from the first sawtooth wave signal;

second operational amplifier means for inverting the parabolic wave signal produced by the first amplifier means and for adding this wave signal and the inverted parabolic wave signal produced by the horizontal deflection circuit to produce an inverted parabolic signal envelope;

linear amplifier means for inverting and amplifying the parabolic signal envelope; and means for applying the amplified signal envelope to the focus electrode of the cathode ray tube to modulate the D.C. voltage of the focus electrode.

2. Focusing circuitry as in claim 1 wherein said first operational amplifier means comprises:

a first operational amplifier whose inverting input receives the sawtooth wave signal; and capacitor means coupled between the output of the operational amplifier and the inverting input.

3. Focusing circuitry as in claim 2 wherein said second operational amplifier means comprises:

a second operational amplifier whose inverting input is coupled to the output of the first operational amplifier, and whose non-inverting input receives the inverted parabolic wave signal produced by the horizontal deflection circuit; and resistor means coupled between the output and inverting input of the second operational amplifier.

4. Focusing circuitry as in claim 3 further including a second capacitor means coupled between the output of the second operational amplifier and the linear amplifier means, and wherein said supplying means comprises a third capacitor means.

5. Focusing circuitry as in claim 4 wherein said linear amplifier means comprises a transistor whose collector electrode is coupled to a voltage source and to the third capacitor means, whose base electrode is coupled to the second capacitor means, and whose emitter electrode is coupled to a negative voltage source, and a diode interconnecting the emitter electrode and base electrode of the transistor.

* * * * *